(12) United States Patent
Pang et al.

(10) Patent No.: US 8,466,775 B2
(45) Date of Patent: Jun. 18, 2013

(54) ELECTRONIC LABEL AUTHENTICATING METHOD AND SYSTEM

(75) Inventors: Liaojun Pang, Shaanxi (CN); Manxia Tie, Shaanxi (CN); Xiaolong Lai, Shaanxi (CN); Zhenhai Huang, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 338 days.

(21) Appl. No.: 13/055,092

(22) PCT Filed: Jul. 24, 2009

(86) PCT No.: PCT/CN2009/072895
§ 371 (c)(1),
(2), (4) Date: Jan. 20, 2011

(87) PCT Pub. No.: WO2010/012210
PCT Pub. Date: Feb. 4, 2011

(65) Prior Publication Data
US 2011/0133902 A1 Jun. 9, 2011

(30) Foreign Application Priority Data
Aug. 1, 2008 (CN) .......................... 2008 1 0150523

(51) Int. Cl.
| | | |
|---|---|---|
| H04Q 5/22 | (2006.01) | |
| G05B 19/00 | (2006.01) | |
| G05B 23/00 | (2006.01) | |
| G01R 31/08 | (2006.01) | |
| H04J 1/16 | (2006.01) | |
| H04L 29/06 | (2006.01) | |
| H04L 9/32 | (2006.01) | |

(52) U.S. Cl.
USPC ........ 340/10.3; 340/10.1; 340/5.61; 370/230; 713/160; 713/179

(58) Field of Classification Search
USPC ... 340/5.61; 726/1–21; 235/375–385; 370/230, 370/235, 236, 328, 329, 474, 476
See application file for complete search history.

(56) References Cited

U.S. PATENT DOCUMENTS
7,646,300 B2 * 1/2010 Stewart et al. ............. 340/572.1
7,818,572 B2 * 10/2010 Stewart et al. ................ 713/169
(Continued)

FOREIGN PATENT DOCUMENTS
| CN | 1938713 A | 3/2007 |
|---|---|---|
| CN | 101103365 A | 1/2008 |

(Continued)

OTHER PUBLICATIONS

Cai Qingling et al. A Mutual Authentication Protocol of Randomized Key Based on EPC C1G2 RFID. Jan. 16, 2007.

Primary Examiner — Daniel Wu
Assistant Examiner — Mohamed Barakat
(74) Attorney, Agent, or Firm — Harness, Dickey & Pierce, P.L.C.

(57) ABSTRACT

An electronic label authenticating method is provided, the method includes: the electronic label receives an accessing authenticating request group sent by a reader-writer, the group carries a first parameter selected by the reader-writer; the electronic label sends a response group of the accessing authenticating to the reader-writer, the response group of the accessing authenticating includes the first parameter and a second parameter selected by the electronic label; the electronic label receives an acknowledgement group of the accessing authenticating feed back by the reader-writer; the electronic label validates the acknowledgement group of the accessing authenticating. An electronic label authenticating system is also provided, the system includes a reader-writer and an electronic label.

15 Claims, 1 Drawing Sheet

U.S. PATENT DOCUMENTS

| | | | |
|---|---|---|---|
| 7,831,827 B2 * | 11/2010 | Walmsley | 713/168 |
| 7,952,481 B2 * | 5/2011 | Shoarinejad et al. | 340/572.1 |
| 7,978,050 B2 * | 7/2011 | Moshfeghi | 340/10.2 |
| 8,078,873 B2 * | 12/2011 | Shah et al. | 713/169 |
| 8,380,982 B2 * | 2/2013 | Miyabayashi et al. | 713/156 |
| 2005/0265349 A1 * | 12/2005 | Garg et al. | 370/395.2 |
| 2007/0008070 A1 * | 1/2007 | Friedrich | 340/10.1 |
| 2007/0181678 A1 * | 8/2007 | Nilsson et al. | 235/383 |
| 2008/0042804 A1 * | 2/2008 | Burbridge et al. | 340/10.1 |

FOREIGN PATENT DOCUMENTS

| | | |
|---|---|---|
| CN | 100405386 C | 7/2008 |
| CN | 101329719 A | 12/2008 |
| CN | 101329720 A | 12/2008 |
| JP | 2005348306 A | 12/2005 |

\* cited by examiner

ELECTRONIC LABEL AUTHENTICATING METHOD AND SYSTEM

CROSS-REFERENCE TO RELATED APPLICATIONS

This application is a 371 U.S. National Stage of International Application No. PCT/CN2009/072895, filed Jul. 24, 2009. This application claims the priority of Chinese Patent Application No. 200810150523.9, filed on Aug. 1, 2008 with Chinese Patent Office and entitled "AN ANONYMOUS AUTHENTICATION METHOD ADAPTED FOR ELECTRONIC TAGS OF THE SAME CATEGORY", the content of which is herein incorporated by reference in its entirety.

FIELD OF THE INVENTION

The present invention relates to the field of information security technology, and particularly to electronic tag authenticating method and system.

BACKGROUND OF THE INVENTION

For wireless network such as wireless local area network or wireless metropolitan area network, security problems are far more serious than those of wired Ethernet. Radio Frequency Identification (RFID) faces security problems as well. Identity authentication and permission verification between a reader and an electronic tag in a RFID system have to be implemented effectively before secure communication can be performed. For all networks, security problems associated with the electronic tags are the most complicated, since the electronic tags themselves have quite different performances and functions, and the product configurations and application requirements thereof are difficult to be unified. Different security strategies have to be designed for each type of electronic tag and the particular application thereof.

Generally, the electronic tags can be classified into approximately three categories according to their usages and application environments: 1) high-level electronic tag with readable and writeable functions and having memory space and computational capacity; 2) mid-level electronic tag with similar functions but slightly poorer performance compared to the high-level electronic tag; 3) low-level electronic tag, which is only used to record some data information and ensures that the information is able to be read and written by a reader, and generally has no data processing function and computational capacity.

If an electronic tag has high performance, certain computational capacity and processing capacity, the bidirectional authentication and permission verification between the electronic tag and the reader may be implemented by using or adapting the secure access protocols of existing wireless network. For example, Chinese security standard of wireless local area network WAPI or the like can be employed. However, if an electronic tag has poor performance and cannot support existing protocols, a new security protocol has to be designed to implement the authentication and permission verification of the electronic tag.

Especially for electronic tags in ISO 18000-6 A category and ISO 18000-6 B category prescribed by International Organization for Standardization (ISO), typical public key algorithm based security protocols are difficult to be implemented due to the poor calculating and processing capabilities of the electronic tags. However, analysis shows that this type of tags can support pre-shared key based security protocols. Therefore, pre-shared key based security authentication protocols are effective solutions for the security problems associated with the electronic tags in ISO 18000-6 A category and ISO 18000-6 B category.

Additionally, it should be noted that in the field of electronic tag, electronic tag identity (ID) generally represents business secrets such as product prices, Producing areas and the like, so confidentiality of the ID needs to be guaranteed during the authentication. To avoid various attacks due to loss of the identity in the protocol with the ID being guaranteed not to be revealed, the ID must be replaced with a temporary identity. For the sake of security, the real identity of an electronic tag can be replaced with a random number to be authenticated during authentication process, such that confidentiality of the electronic tag ID is guaranteed.

Currently, pre-shared key based authentication protocols adapted for electronic tags have been proposed in the industry. However, analysis shows that these protocols commonly have some security problems and are difficult to be secure and practicable. Specifically, existing protocols have following security problems:

1. Updating of the shared key may introduce potential insecurity. In pre-shared key based security protocols, the shared key, the security of which is the basis of the whole system, is written manually in a reliable way. Dynamically updating the shared key in the protocols would inevitably introduce unsecure and unreliable components which degrade the security of the system.

2. Frequent writing of the shared key would cause large energy loss in the system, which may result in lower availability of the electronic tag because the performance of the electronic tag is sensible to energy.

3. Cyclic redundancy check (CRC) is used to check integrity of protocol message, and the calculation of the integrity check code involves no secret information shared between two communicating parties, so active attacks may not be resisted.

4. Updating of shared key has no forward-secrecy. If an updated key is deciphered by an attacker for one time, the attacker may calculate all of the shared keys negotiated later.

5. Updating of shared key has no backward-secrecy. If an updated key is deciphered by an attacker for one time, the attacker may calculate all of the shared keys negotiated earlier.

6. Both parties of the protocol have to store information related to integrity check of message calculated for each time, which would increase storage burden of the system.

7. Prior solutions perform authentication for each specific tag, other than perform a universal authentication for electronic tags of a same category. Therefore, a server has to store information related to each electronic tag, which means a heavy storage burden.

In view of above considerations, there is need for a new anonymous bidirectional authentication protocol, which is pre-shared key based and is adapted to authenticate electronic tags of a category instead of a separate one electronic tag, to implement bidirectional authentication and permission verification between the electronic tag and the reader, and to guarantee data security for the electronic tags of the category.

SUMMARY OF THE INVENTION

Embodiments of the present invention provide pre-shared key based bidirectional authenticating method and system for electronic tag, which may resolve the security problems of existing authentication protocols in the electronic tag field.

An embodiment of the present invention provides a method for authenticating an electronic tag, the method including the steps of:

receiving, by the electronic tag, a request packet for access authentication from a reader, wherein the request packet carries a first parameter selected by the reader;

sending, by the electronic tag, a response packet for access authentication to the reader, wherein the response packet for access authentication includes the first parameter and a second parameter selected by the electronic tag;

receiving, by the electronic tag, an acknowledgement packet for access authentication fed back from the reader, wherein the acknowledgement packet for access authentication is constructed after the reader receives the response packet for access authentication and after the electronic tag passes the authentication from the reader; and acknowledging, by the electronic tag, the acknowledgement packet for access authentication.

An embodiment of the present invention provides a system for authenticating an electronic tag, the system including:

a reader for sending a request packet for access authentication to an electronic tag, wherein the packet carries a first parameter selected by the reader-writer, and for constructing and sending an acknowledgment packet for access authentication to the electronic tag upon receiving a response packet for access authentication from the electronic tag;

the electronic tag for constructing and sending the response packet for access authentication to the reader, wherein the response packet for access authentication includes the first parameter and a second parameter selected by the electronic tag, and for acknowledging an acknowledgment packet for access authentication after receiving the acknowledgment packet for access authentication fed back from the reader.

In embodiments of the present invention, bidirectional authentication is performed between a reader and an electronic tag, thereby increasing security and reliability. Since there is no need to update pre-shared key, the efficiency of protocol is increased without decreasing the security. Using more secure and reliable technology of message integrity check, active attacks may be resisted. Furthermore, it is possible to save energy of the system and increase availability of the electronic tags since the shared key is not needed to be frequently rewritten. The requirement for storage of the system is also decreased since there is no need to store the value for message integrity check calculated for each time. Information related to the authentication is same for all electronic tags of the same category, thus a server needs to store only one piece of information, instead of storing one piece of information for each electronic tag. Hence, storage space for the system is significantly saved.

R: reader;
T: electronic tag;
ID: electronic tag identity;
TempID: publicly available temporary identity of electronic tag;
Key: pre-shared key shared by reader and electronic tag;
PData: privacy data of electronic tag, such as product price, production areas or other data needed to be kept secret;
H(x): unidirectional hash function;
N1: random number selected by reader;
N2: random number selected by electronic tag;
SKey: session key.

DETAILED DESCRIPTION

Figure 1:
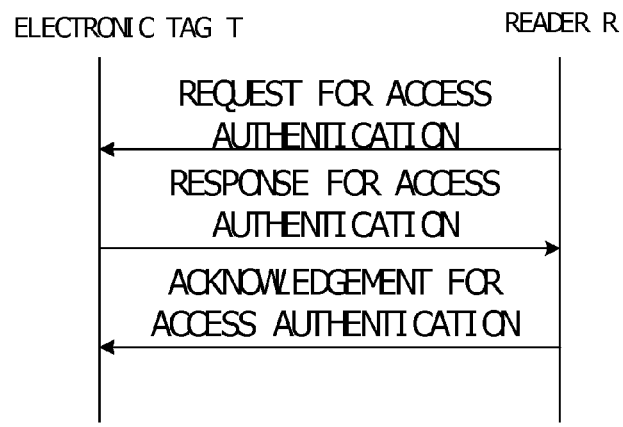
FIG. 1 is a schematic flow chart of a bidirectional authentication process according an embodiment of the present invention.

Referring to FIG. 1, a pre-shared key based anonymous bidirectional authentication method according the present invention includes the steps of:

1) A reader R sends a request packet for access authentication to an electronic tag T. The packet includes:

| N1 | wherein N1 field is a random number selected by the reader.

When receiving the request packet, the electronic tag constructs a response packet for access authentication to be sent to the reader.

2) The electronic tag T sends the response packet for access authentication to the reader R. The packet includes:

| TempID | N1 | N2 | MIC | wherein,
TempID field is a temporary identity of the electronic tag and has value of H(ID∥N1);
N1 field is the random number selected by the reader;
N2 field is a random number selected by the electronic tag;
MIC field is a value for message integrity check calculated for the electronic tag and equals to H(TempID ∥N2∥ Key).

When the reader receives the response packet for access authentication from the electronic tag, it is first determined that whether N1 is the random number selected by the reader. If N1 is not the random number selected by the reader, the packet is discarded; otherwise the reader searches in a background database. If an ID of a certain tag category, from which and N1 a temporary identity TempID is calculated to be equal to the received TempID, may be found in the database, corresponding information of Key in the background database is read and H(TempID∥N2∥Key) is calculated. The calculated result is compared to the value of received MIC. If the two are not equal, the message is discarded and it is determined that the authentication is failed; otherwise an acknowledgment packet for access authentication is constructed and sent to the electronic tag.

3) The reader R sends the acknowledgment packet for access authentication to the electronic tag T. The packet includes:

| N2 | MIC | wherein,
N2 field is the random number selected by the electronic tag;
MIC field is the value for message integrity check calculated for the electronic tag and equals to H(N2∥ Key).

When the electronic tag receives the acknowledgment packet for access authentication, it is first determined whether N2 is the random number selected by the electronic tag. If N2 is not the random number selected by the electronic tag, the packet is discarded; otherwise a MIC is recalculated by the electronic tag and is compared to the received MIC. If the two MICs are not equal, the packet is discarded; otherwise it is determined that the authentication is passed.

By the above protocol, a pre-shared key based bidirectional authentication can be implemented between each electronic tag of a same tag category and a reader, while ID information of the electronic tag would not be revealed.

After authentication the electronic tag and reader each may derive a same session key SKey from the Key and the ID, and may utilize the SKey as an encryption key for encrypting privacy data PData in the tag, so as to protect the content contained in electronic tags of this category.

Additionally, it should be noted that although embodiments of the present invention are described with respect to the electronic tag and reader, the authentication entity for authenticating at the reader may also reside in a background server.

Figure 2:
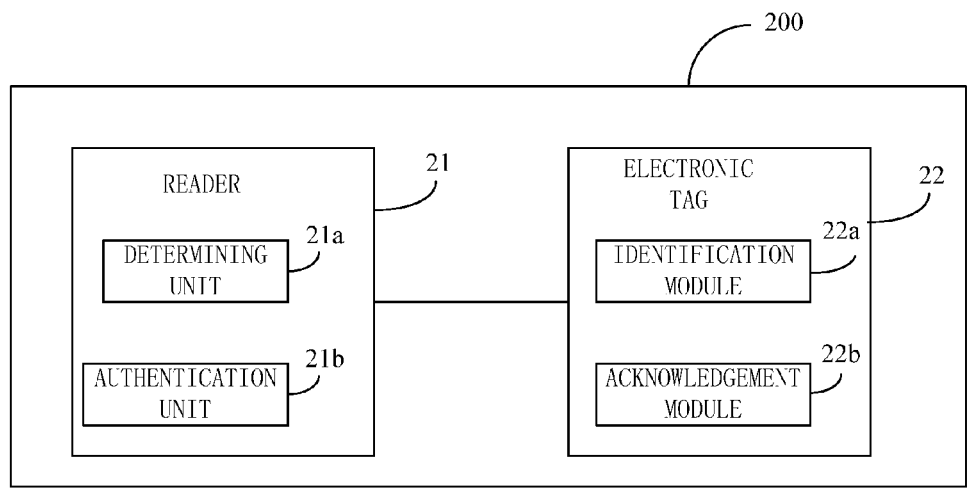
FIG. 2 is a schematic structural chart of a system for authenticating an electronic tag according an embodiment of the present invention.

Referring to FIG. 2, an embodiment of the present invention provides a system 200 for authenticating an electronic tag, which includes:

a reader 21 for sending a request packet for access authentication to an electronic tag, wherein the packet carries a first parameter selected by the reader-writer, and for constructing and sending an acknowledgment packet for access authentication to the electronic tag upon receiving a response packet for access authentication from the electronic tag;

the electronic tag 22 for constructing and sending the response packet for access authentication to the reader, wherein the response packet for access authentication includes the first parameter and a second parameter selected by the electronic tag, and for acknowledging an acknowledgment packet for access authentication after receiving the acknowledgment packet for access authentication fed back from the reader.

The reader 21 includes:

a determining unit 21a for determining whether the first parameter in the currently received response packet for access authentication is the selected first parameter N1, and if the first parameter in the received response packet for access authentication is not N1, discarding the packet, otherwise sending a notification to an authentication unit;

the authentication unit 21b for upon receiving the notification from the determining unit searching in a background database for a tag ID from which and N1 a TempID is calculated to be equal to the received TempID, reading a corresponding Key in the background database, calculating H(TempID∥ N2∥Key), and comparing the calculated result with a received value for message integrity check, if the calculated result equals to the received value for message integrity check, determining that the authentication is passed, otherwise discarding the packet and determining that the authentication is failed.

The electronic tag 22 includes:

an identification module 22a for determining whether a second parameter N2 in the received acknowledgement packet for access authentication is the second parameter selected by the electronic tag, and if N2 is not the second parameter selected by the electronic tag, discarding the packet, otherwise sending a notification to an acknowledgement module;

the acknowledgement module 22b for recalculating a value for message integrity check upon receiving the notification from the identification unit, and comparing the recalculated value with the value for message integrity check in the received acknowledgement packet for access authentication, if the two values are not equal, discarding the packet, otherwise determining that the authentication is passed.

From above, in embodiments of the present invention, bidirectional authentication is performed between a reader and an electronic tag, thereby increasing security and reliability. Since there is no need to update pre-shared key, the efficiency of protocol is increased without decreasing the security. Using more secure and reliable technology of message integrity check, active attacks may be resisted. Furthermore, it is possible to save energy of the system and increase availability of the electronic tags since the shared key is not needed to be frequently rewritten. The requirement for storage of the system is also decreased since there is no need to store the value for message integrity check calculated for each time. Information related to the authentication is same for all electronic tags of the same category, thus a server needs to store only one piece of information, instead of storing one piece of information for each electronic tag. Hence, storage space for the system is significantly saved.

The objectives, technical solutions and advantages of the present invention have been described in details by the above embodiments. However, it should be appreciated that the above descriptions are only preferred embodiments of the present invention and do not limit the present invention. Various modifications, alternatives and improvements within the spirit and principle of the present invention should fall in the scope of the present invention.

The invention claimed is:

1. A method for authenticating an electronic tag comprising:
    receiving, by the electronic tag, a request packet for access authentication from a reader, wherein the request packet carries a first parameter selected by the reader;
    sending, by the electronic tag, a response packet for access authentication to the reader, wherein the response packet for access authentication comprises the first parameter and a second parameter selected by the electronic tag;
    receiving, by the electronic tag, an acknowledgement packet for access authentication fed back from the reader, wherein the acknowledgement packet for access authentication is constructed after the reader receives the response packet for access authentication and after the electronic tag passes the authentication from the reader;
    acknowledging, by the electronic tag, the acknowledgement packet for access authentication;
    wherein the response packet for access authentication further comprises:
    a temporary identity of the electronic tag, which has a value of H(ID∥N1);
    a value for message integrity check calculated by the electronic tag, which equals to H(TempID∥N2∥Key); and
    wherein the acknowledgement packet for access authentication comprises:
    the second parameter selected by the electronic tag; and
    a value for message integrity check calculated by the reader, which equals to H(N2∥Key).

2. The method for authenticating an electronic tag of claim 1, wherein before the reader sending the response packet for access authentication to the electronic tag, the method further comprises initializing system parameters.

3. The method for authenticating an electronic tag of claim 2, wherein the initializing system parameters comprises:
    writing a tag identity hereinafter referred to as ID and a pre-shared key hereinafter referred to as Key, into the electronic tag; and
    storing information of the tag comprising the ID, the Key and PData into the reader.

4. The method for authenticating an electronic tag of claim 1, wherein the first parameter is a random number selected by the reader and the second parameter is a random number selected by the electronic tag.

5. The method for authenticating an electronic tag of claim 1, wherein the authenticating the electronic tag according to the first parameter comprises:
  determining, by the reader, whether the first parameter in the received response packet for access authentication is the selected first parameter N1, and if the first parameter in the received response packet for access authentication is not N1, discarding the packet;
  if the first parameter in the received response packet for access authentication is N1, searching in a background database for a tag ID from which and N1 a TempID is calculated to be equal to the received TempID, reading a corresponding Key in the background database, and calculating H(TempID∥N2∥Key);
  comparing the calculated result with the received value for message integrity check, and if the calculated result equals to the received value for message integrity check, determining that the authentication is passed; otherwise discarding the packet and determining that the authentication is failed.

6. The method for authenticating an electronic tag of claim 1, wherein the acknowledging by the electronic tag the acknowledgement packet for access authentication comprises:
  determining, by the electronic tag, whether a second parameter N2 in the received acknowledgement packet for access authentication is the second parameter selected by the electronic tag, and if N2 is not the second parameter selected by the electronic tag, discarding the packet, otherwise recalculating the value for message integrity check;
  comparing the recalculated value with the value for message integrity check in the received acknowledgement packet for access authentication, and if the two values are not equal, discarding the packet, otherwise determining that the authentication is passed.

7. The method for authenticating an electronic tag of claim 1, wherein the authentication by the reader is implemented by a background server.

8. The method for authenticating an electronic tag of claim 2, wherein the first parameter is a random number selected by the reader and the second parameter is a random number selected by the electronic tag.

9. The method for authenticating an electronic tag of claim 3, wherein the first parameter is a random number selected by the reader and the second parameter is a random number selected by the electronic tag.

10. The method for authenticating an electronic tag of claim 4, wherein the acknowledging by the electronic tag the acknowledgement packet for access authentication comprises:
  determining, by the electronic tag, whether a second parameter N2 in the received acknowledgement packet for access authentication is the second parameter selected by the electronic tag, and if N2 is not the second parameter selected by the electronic tag, discarding the packet, otherwise recalculating the value for message integrity check;
  comparing the recalculated value with the value for message integrity check in the received acknowledgement packet for access authentication, and if the two values are not equal, discarding the packet, otherwise determining that the authentication is passed.

11. The method for authenticating an electronic tag of claim 8, wherein the acknowledging by the electronic tag the acknowledgement packet for access authentication comprises:
  determining, by the electronic tag, whether a second parameter N2 in the received acknowledgement packet for access authentication is the second parameter selected by the electronic tag, and if N2 is not the second parameter selected by the electronic tag, discarding the packet, otherwise recalculating the value for message integrity check;
  comparing the recalculated value with the value for message integrity check in the received acknowledgement packet for access authentication, and if the two values are not equal, discarding the packet, otherwise determining that the authentication is passed.

12. The method for authenticating an electronic tag of claim 9, wherein the acknowledging by the electronic tag the acknowledgement packet for access authentication comprises:
  determining, by the electronic tag, whether a second parameter N2 in the received acknowledgement packet for access authentication is the second parameter selected by the electronic tag, and if N2 is not the second parameter selected by the electronic tag, discarding the packet, otherwise recalculating the value for message integrity check;
  comparing the recalculated value with the value for message integrity check in the received acknowledgement packet for access authentication, and if the two values are not equal, discarding the packet, otherwise determining that the authentication is passed.

13. A system for authenticating an electronic tag comprising:
  a reader for sending a request packet for access authentication to an electronic tag, wherein the packet carries a first parameter selected by the reader-writer, and for constructing and sending an acknowledgment packet for access authentication to the electronic tag upon receiving a response packet for access authentication from the electronic tag;
  the electronic tag for constructing and sending the response packet for access authentication to the reader, wherein the response packet for access authentication comprises the first parameter and a second parameter selected by the electronic tag, and for acknowledging an acknowledgment packet for access authentication after receiving the acknowledgment packet for access authentication fed back from the reader;
  wherein the response packet for access authentication further comprises:
  a temporary identity of the electronic tag, which has a value of H(ID∥N1);
  a value for message integrity check calculated by the electronic tag, which equals to H(TempID∥N2∥Key); and
  wherein the acknowledgement packet for access authentication comprises:
  the second parameter selected by the electronic tag; and
  a value for message integrity check calculated by the reader, which equals to H(N2∥Key).

14. The system for authenticating an electronic tag of claim 13, wherein the reader further comprises:
  a determining unit for determining whether the first parameter in the currently received response packet for access authentication is the selected first parameter N1, and if the first parameter in the received response packet for access authentication is not N1, discarding the packet, otherwise sending a notification to an authentication unit;

the authentication unit for upon receiving the notification from the determining unit searching in a background database for a tag ID from which and N1 a TempID is calculated to be equal to the received TempID, reading a corresponding Key in the background database, calculating H(TempID∥N2∥Key), and comparing the calculated result with a received value for message integrity check, if the calculated result equals to the received value for message integrity check, determining that the authentication is passed, otherwise discarding the packet and determining that the authentication is failed.

15. The system for authenticating an electronic tag of claim 13, wherein the electronic tag further comprises:

an identification module for determining whether a second parameter N2 in the received acknowledgement packet for access authentication is the second parameter selected by the electronic tag, and if N2 is not the second parameter selected by the electronic tag, discarding the packet, otherwise sending a notification to an acknowledgement module;

the acknowledgement module for recalculating a value for message integrity check upon receiving the notification from the identification unit, and comparing the recalculated value with the value for message integrity check in the received acknowledgement packet for access authentication, if the two values are not equal, discarding the packet, otherwise determining that the authentication is passed.

* * * * *